US012216430B2

(12) United States Patent
Kato et al.

(10) Patent No.: US 12,216,430 B2
(45) Date of Patent: Feb. 4, 2025

(54) IMAGE FORMING APPARATUS AND PROCESS CARTRIDGE

(71) Applicant: BROTHER KOGYO KABUSHIKI KAISHA, Nagoya (JP)

(72) Inventors: Yasutada Kato, Nagoya (JP); Shunsuke Ishii, Nagoya (JP); Masatoshi Shiraki, Nagoya (JP); Shougo Sato, Seto (JP)

(73) Assignee: BROTHER KOGYO KABUSHIKI KAISHA, Nagoya (JP)

(*) Notice: Subject to any disclaimer, the term of this patent is extended or adjusted under 35 U.S.C. 154(b) by 0 days.

(21) Appl. No.: 18/538,462

(22) Filed: Dec. 13, 2023

(65) Prior Publication Data

US 2024/0111244 A1 Apr. 4, 2024

Related U.S. Application Data

(63) Continuation of application No. 17/832,833, filed on Jun. 6, 2022, now Pat. No. 11,892,797.

(30) Foreign Application Priority Data

Jul. 1, 2021 (JP) ................................ 2021-109986

(51) Int. Cl.
*G03G 21/16* (2006.01)
*G03G 21/18* (2006.01)
*G03G 15/08* (2006.01)

(52) U.S. Cl.
CPC ..... *G03G 21/1814* (2013.01); *G03G 15/0865* (2013.01)

(58) Field of Classification Search
CPC ............ G03G 15/0865; G03G 15/087; G03G 15/0894; G03G 21/1814; G03G 2215/00987
See application file for complete search history.

(56) References Cited

U.S. PATENT DOCUMENTS

2009/0297209 A1* 12/2009 Nakajima .......... G03G 15/0855 399/258
2011/0280616 A1* 11/2011 Itabashi ............ G03G 15/0886 399/258

(Continued)

FOREIGN PATENT DOCUMENTS

WO 2020/180343 A1 9/2020

OTHER PUBLICATIONS

Office Action dated Mar. 27, 2023 received in U.S. Appl. No. 17/832,833.

(Continued)

*Primary Examiner* — Hoang X Ngo
(74) *Attorney, Agent, or Firm* — Scully, Scott, Murphy & Presser, P.C.

(57) ABSTRACT

An image forming apparatus, having a main housing, a first photosensitive drum, a second photosensitive drum, a first developing device to supply toner to the first photosensitive drum, a second developing device to supply toner to the second photosensitive drum, a first reloading device to reload the first developing device with the toner, and a second reloading device to reload the second developing device with the toner, is provided. The first reloading device has a first reloading port, which accepts the toner for reloading the first developing device. The first reloading port is openable to an outside of the main housing. The second reloading device has a second reloading port, which accepts the toner for reloading the second developing device. The second reloading port is openable to the outside of the main housing.

9 Claims, 9 Drawing Sheets

1

(56) References Cited

U.S. PATENT DOCUMENTS

| | | | | |
|---|---|---|---|---|
| 2014/0072334 A1* | 3/2014 | Itabashi | ............ | G03G 15/0886 399/110 |
| 2021/0109457 A1 | 4/2021 | Wada et al. | | |

OTHER PUBLICATIONS

Notice of Allowance dated Sep. 13, 2023 received in U.S. Appl. No. 17/832,833.

* cited by examiner

IMAGE FORMING APPARATUS AND PROCESS CARTRIDGE

REFERENCE TO RELATED APPLICATIONS

This application is a continuation of U.S. patent application Ser. No. 17/832,833, filed on Jun. 6, 2022, which claims priority under 35 U.S.C. § 119 from Japanese Patent Application No. 2021-109986, filed on Jul. 1, 2021, the entire subject matter of which is incorporated herein by reference.

BACKGROUND ART

The present disclosure is related to an image forming apparatus and a process cartridge.

An image forming apparatus having a developing device and a reloading device is known. The reloading device may reload the developing device with toner and may have a reloading port. Through the reloading port, a toner-reloading cartridge may be attached to the reloading device, and the reloading device may receive the reloading toner from the toner-reloading cartridge. Thus, the toner may be transported from the toner-reloading cartridge through the reloading device to the developing device.

SUMMARY

The above-mentioned image forming apparatus may be known as a monochrome printer, which is reloadable with toner in a single color. Meanwhile, there may be demands for a multicolor image forming apparatus using toners in multiple colors to be reloadable with toners externally in a purpose of, for example, reducing running cost of the multicolor image forming apparatus.

The present disclosure is advantageous in that an image forming apparatus and a process cartridge, having a plurality of developing devices which are externally reloadable with respective toners from outside of a body of the image forming apparatus, are provided.

According to an aspect of the present disclosure, a printing apparatus, having a main housing, a first photosensitive drum, a second photosensitive drum, a first developing device configured to supply toner to the first photosensitive drum, a second developing device configured to supply toner to the second photosensitive drum, a first reloading device configured to reload the first developing device with the toner, and a second reloading device configured to reload the second developing device with the toner, is provided. The first reloading device has a first reloading port. The first reloading port is configured to accept the toner for reloading the first developing device. The first reloading port is openable to an outside of the main housing. The second reloading device has a second reloading port. The second reloading port is configured to accept the toner for reloading the second developing device. The second reloading port is openable to the outside of the main housing.

According to another aspect of the present disclosure, a process cartridge, having a first photosensitive drum, a second photosensitive drum, a first developing device configured to supply toner to the first photosensitive drum, a second developing device configured to supply toner to the second photosensitive drum, a first reloading device configured to reload the first developing device with the toner, and a second reloading device configured to reload the second developing device with the toner, is provided. The first reloading device has a first reloading port. The first reloading port is configured to accept the toner for reloading the first developing device. The second reloading device has a second reloading port. The second reloading port is configured to accept the toner for reloading the second developing device.

DESCRIPTION

1. Overall Configuration of Image Forming Apparatus 1

Figure 1:
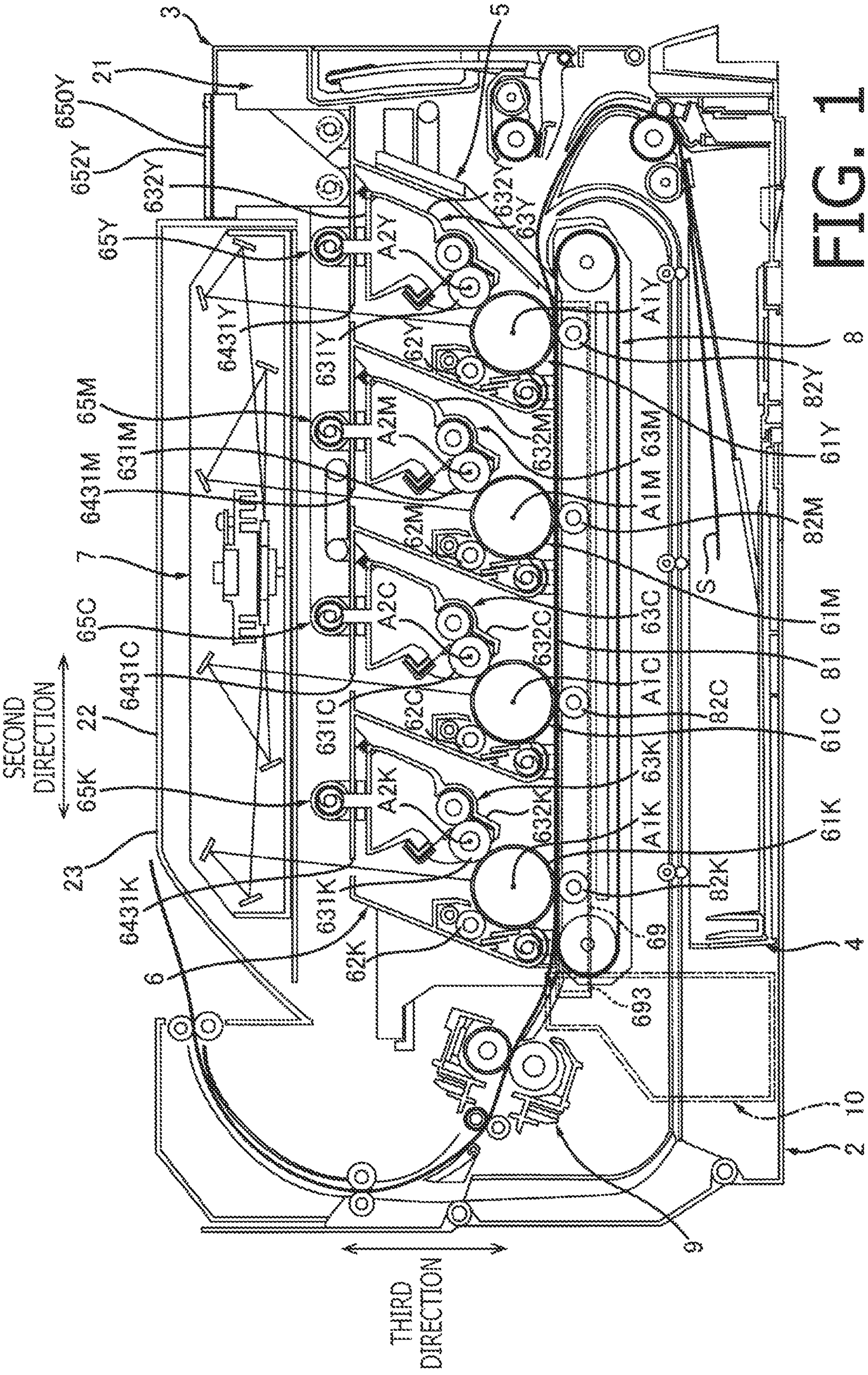
FIG. 1 is a cross-sectional overall view of an image forming apparatus.
Figure 2:
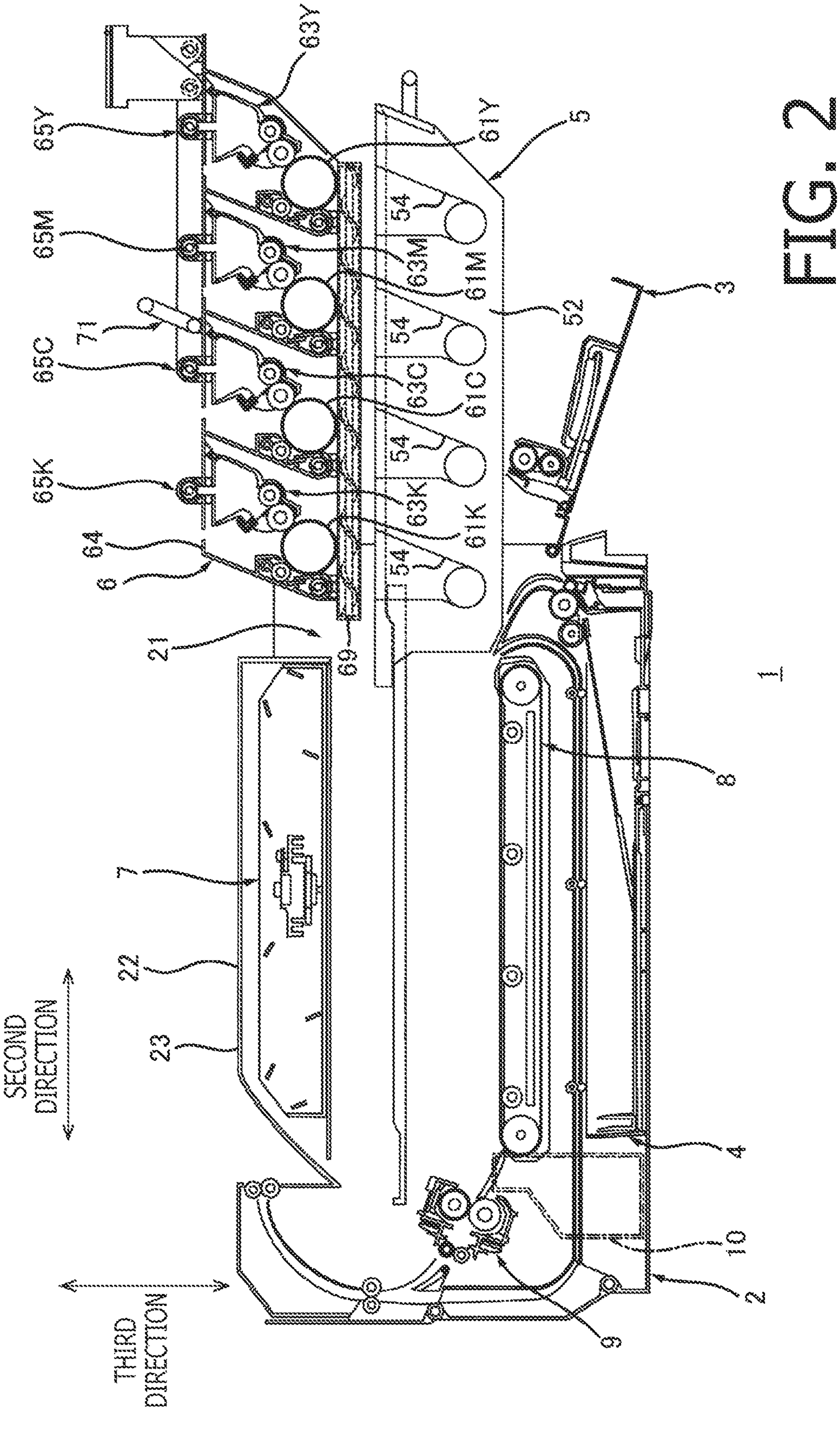
FIG. 2 is an illustrative view of the image forming apparatus, with a drawer being located at an outer position and a process cartridge being detached from the drawer.

With reference to FIGS. 1-2, an overall configuration of an image forming apparatus 1 will be described.

As shown in FIGS. 1-2, the image forming apparatus 1 includes a main housing 2, a cover 3, a sheet container 4, a drawer 5, a process cartridge 6, an exposure device 7, a transfer device 8, and a fuser 9.

1.1 Main Housing 2

The main housing 2 accommodates the sheet container 4, the drawer 5, the process cartridge 6, the exposure device 7, the transfer device 8, and the fuser 9. The main housing 2 has an opening 21. The opening 21 is located at one end of the main housing 2 in a second direction, which will be described further below.

The main housing 2 has an upper wall 22, which includes an ejection tray 23. The upper wall 22 is located at an upper end of the main housing 2, under a condition where the image forming apparatus 1 is placed on a horizontal plane. Sheets S ejected from the main housing 2 may rest on the ejection tray 23.

1.2 Cover 3

The cover 3 is movable between a closed position (see FIG. 1) and an open position (see FIG. 2). When the cover 3 is located at the closed position, the cover 3 closes the opening 21. When the cover 3 is located at the open position, the opening 21 is exposed.

1.3 Sheet Container 4

The sheet container 4 may store sheets S therein. The sheets S in the sheet container 4 may be conveyed toward the transfer device 8.

1.4 Drawer 5

The drawer 5 may support the process cartridge 6. The drawer 5 is movable between an inner position (see FIG. 1) and an outer position (see FIG. 2) through the opening 21 of the main housing 2, under a condition where the cover 3 is located at the open position. The drawer 5 is movable in the second direction. The drawer 5 is, when located at the inner position, entirely located inside the main housing 2. When located at the outer position, the drawer 5 is at least partly located outside the main housing 2.

1.5 Process Cartridge 6

The process cartridge 6 is exchangeable with another process cartridge 6 through the opening 21 of the main housing 2 under the condition where the cover 3 is located at the open position. When the drawer 5 is located at the outer position, the process cartridge 6 may be supported by the drawer 5. Under a condition where the process cartridge 6 is supported by the drawer 5, the process cartridge 6 may move through the opening 21.

The process cartridge 6 has a plurality of photosensitive drums 61Y, 61M, 61C, 61K, a plurality of chargers 62Y, 62M, 62C, 62K, and a plurality of developing devices 63Y, 63M, 63C, 63K. In other words, the image forming apparatus 1 has the plurality of photosensitive drums 61Y, 61M, 61C, 61K, the plurality of chargers 62Y, 62M, 62C, 62K, and the plurality of developing devices 63Y, 63M, 63C, 63K.

1.5.1 Photosensitive Drums 61Y, 61M, 61C, 61K

The photosensitive drum 61Y is rotatable on a drum axis A1Y. The drum axis A1Y extends in a first direction.

The photosensitive drum 61M is rotatable on a drum axis A1M. The drum axis A1M extends in the first direction.

The photosensitive drum 61C is rotatable on a drum axis A1C. The drum axis A1C extends in the first direction.

The photosensitive drum 61K is rotatable on a drum axis A1K. The drum axis A1K extends in the first direction.

The photosensitive drums 61Y, 61M, 61C, 61K extend in the first direction. Each of the photosensitive drums 61Y, 61M, 61C, 61K has a cylindrical shape. The photosensitive drums 61Y, 61M, 61C, 61K align in the second direction, which intersects with the first direction. Preferably, the second direction may intersect orthogonally with the first direction.

1.5.2 Chargers 62Y, 62M, 62C, 62K

The charger 62Y may charge a circumferential surface of the photosensitive drum 61Y. The charger 62M may charge a circumferential surface of the photosensitive drum 61M. The charger 62C may charge a circumferential surface of the photosensitive drum 61C. The charger 62K may charge a circumferential surface of the photosensitive drum 61K.

The chargers 62Y, 62M, 62C, 62K may be, for example, charging rollers. Optionally, the chargers 62Y, 62M, 62C, 62K may be scorotron-typed chargers.

1.5.3 Developing Devices 63Y, 63M, 63C, 63K

The developing device 63Y may supply toner to the photosensitive drum 61Y. The developing device 63Y has a developing roller 631Y and a development housing 632Y. The developing roller 631Y may supply the toner in the development housing 632Y to the photosensitive drum 61Y. The developing roller 631Y is arranged to contact the photosensitive drum 61Y. The developing roller 631Y extends in the first direction. The developing roller 631Y is rotatable on an axis A2Y. The axis A2Y extends in the first direction. The development housing 632Y may store the toner.

The developing device 63M may supply toner to the photosensitive drum 61M. The developing device 63M has a developing roller 631M and a development housing 632M. The developing roller 631M may supply the toner in the development housing 632M to the photosensitive drum 61M. The developing roller 631M is arranged to contact the photosensitive drum 61M. The developing roller 631M extends in the first direction. The developing roller 631M is rotatable on an axis A2M. The axis A2M extends in the first direction. The development housing 632M may store the toner.

The developing device 63C may supply toner to the photosensitive drum 61M. The developing device 63C has a developing roller 631C and a development housing 632C. The developing roller 631C may supply the toner in the development housing 632C to the photosensitive drum 61C. The developing roller 631C is arranged to contact the photosensitive drum 61C. The developing roller 631C extends in the first direction. The developing roller 631C is rotatable on an axis A2C. The axis A2C extends in the first direction. The development housing 632C may store the toner.

The developing device 63K may supply toner to the photosensitive drum 61K. The developing device 63K has a developing roller 631K and a development housing 632K. The developing roller 631K may supply the toner in the development housing 632K to the photosensitive drum 61K. The developing roller 631K is arranged to contact the photosensitive drum 61K. The developing roller 631K extends in the first direction. The developing roller 631K is rotatable on an axis A2K. The axis A2K extends in the first direction. The development housing 632K may store the toner.

1.6 Exposure Device 7

The exposure device 7 may expose the circumferential surfaces of the photosensitive drums 61Y, 61M, 61C, 61K. The exposure device 7 may be, for example, a laser-scanning unit.

1.7 Transfer Device 8

The transfer device 8 is located at a position below the photosensitive drums 61Y, 61M, 61C, 61K. The transfer device 8 has a belt 81 and transfer rollers 82Y, 82M, 82C, 82K.

The belt 81 may convey the sheet S fed from the sheet container 4 toward the fuser 9. Under a condition where the process cartridge 6 is supported by the drawer 5 and where the drawer 5 is located at the inner position, the belt 81 contacts the photosensitive drums 61Y, 61M, 61C, 61K.

The transfer roller 82Y may transfer to the toner on the photosensitive drum 61Y to the sheet S being conveyed by the belt 81. The transfer roller 82M may transfer to the toner on the photosensitive drum 61M to the sheet S being conveyed by the belt 81. The transfer roller 82C may transfer to the toner on the photosensitive drum 61C to the sheet S being conveyed by the belt 81. The transfer roller 82K may transfer to the toner on the photosensitive drum 61K to the sheet S being conveyed by the belt 81.

1.8 Fuser 9

The fuser 9 is located apart from the cover 3 in the second direction. The fuser 9 may apply heat and pressure to the sheet S, on which the toners are transferred, to fix the toners onto the sheet S. The sheet S exiting the fuser 9 may be ejected outside the main housing 2 and rest on the ejection tray 23.

2. Detailed Configuration of Process Cartridge 6

With reference to FIGS. 3-8, the process cartridge 6 will be described in detail. Further to the photosensitive drums 61Y, 61M, 61C, 61K, the chargers 62Y, 62M, 62C, 62K, and the developing devices 63Y, 63M, 63C, 63K described above, as shown in FIG. 3, the process cartridge 6 has a process housing 64, a plurality of reloading devices 65Y, 65M, 65C, 65K, a plurality of sealer members 66Y, 66M, 66C, 66K (see FIG. 4), a plurality of pressing members 67Y, 67M, 67C, 67K (see FIG. 4), a plurality of cleaners 68Y, 68M, 68C, 68K (see FIG. 4), a waste toner tube 69, a screw 70 (see FIG. 4), and a handle 71. In other words, the image forming apparatus 1 has the reloading devices 65Y, 65M.

2.1 Detailed Configuration of Process Housing 64

Figure 4:
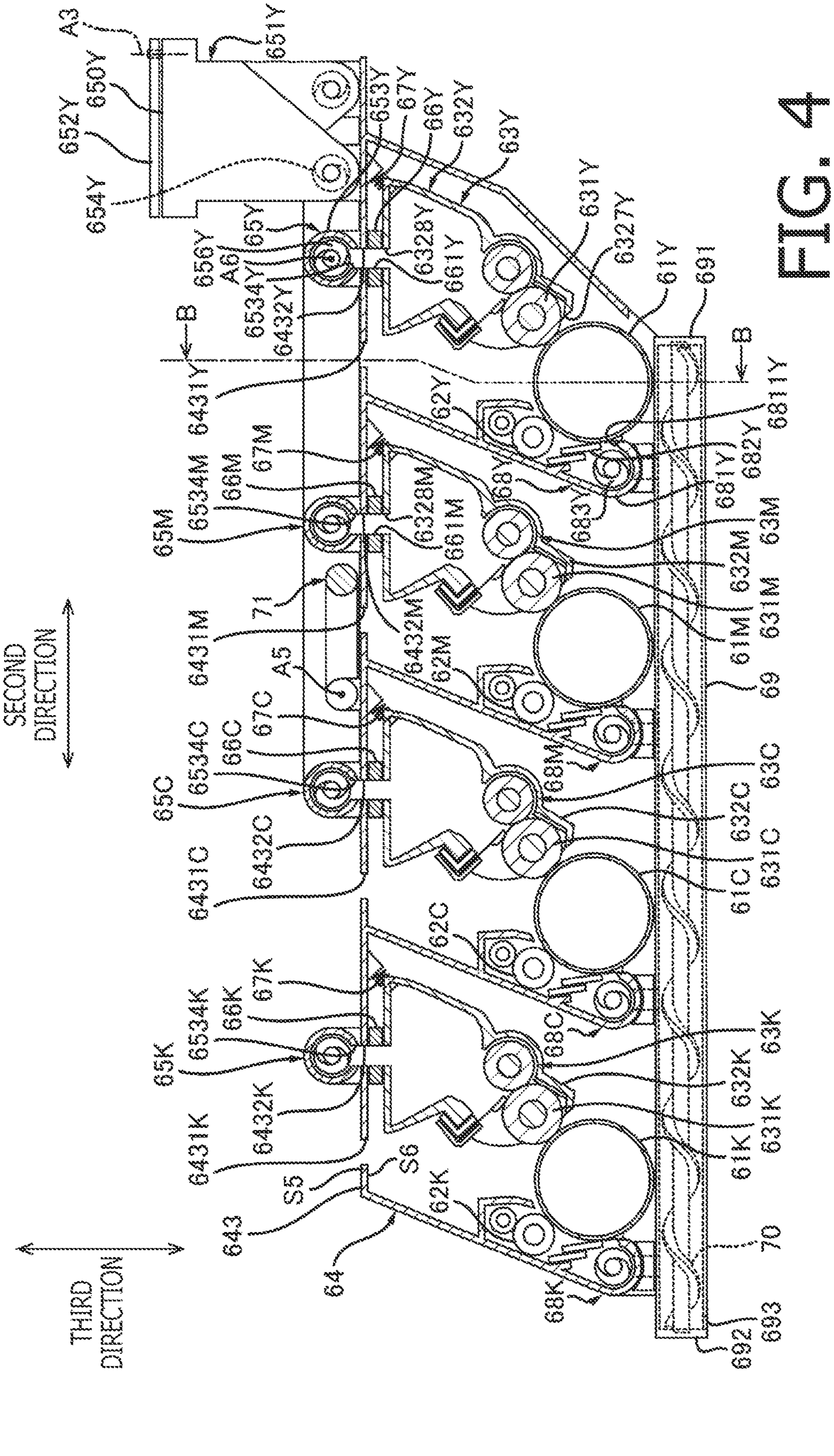
FIG. 4 is a cross-sectional view of the process cartridge sectioned at a line A-A shown in FIG. 3.

As shown in FIG. 4, the process housing 64 supports the photosensitive drums 61Y, 61M, 61C, 61K, the chargers 62Y, 62M, 62C, 62K, the developing devices 63Y, 63M, 63C, 63K, the sealer members 66Y, 66M, 66C, 66K, the pressing members 67Y, 67M, 67C, 67K, and the cleaners 68Y, 68M, 68C, 68K.

Figure 5:
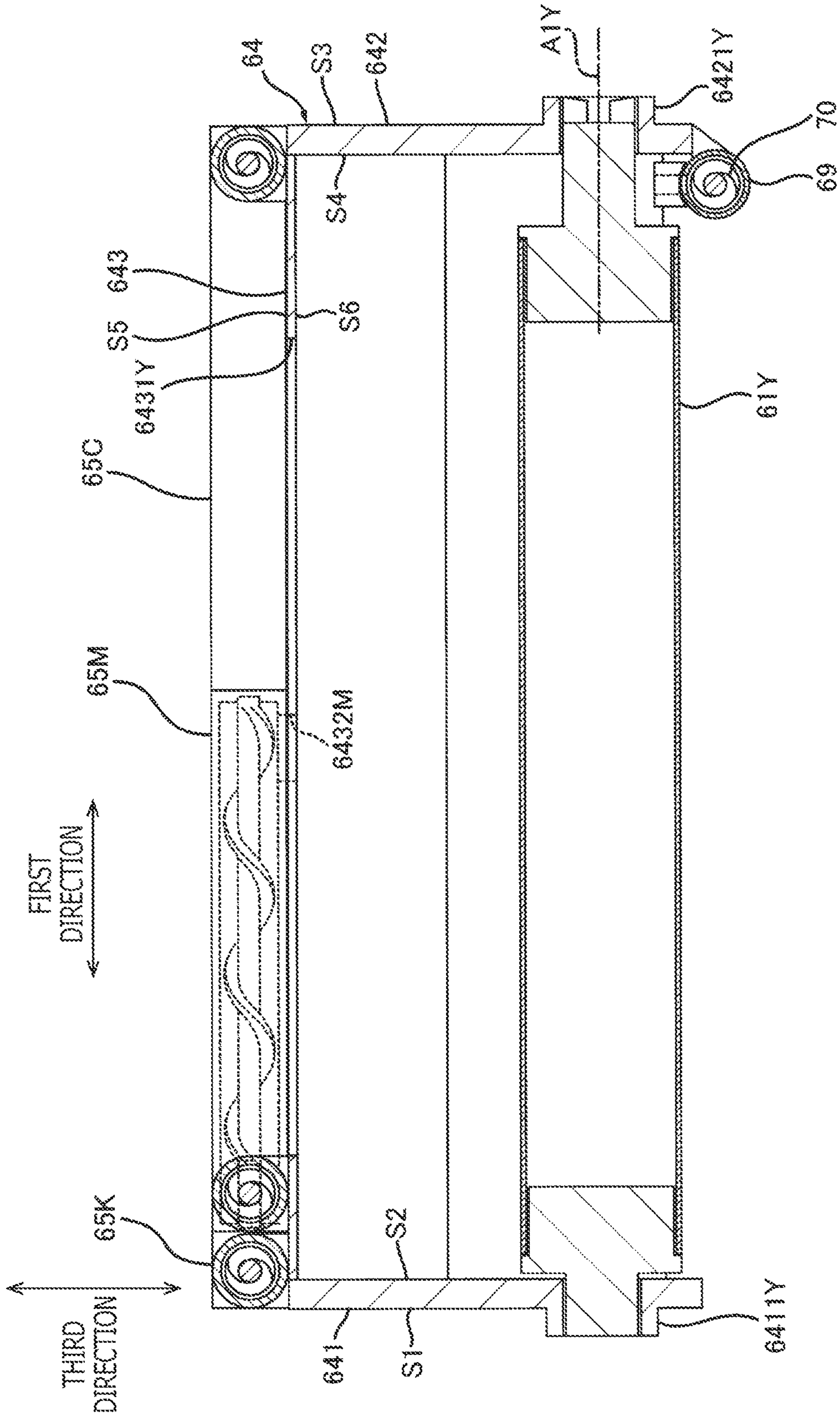
FIG. 5 is a cross-sectional view of the process cartridge sectioned at a line B-B shown in FIG. 4.

As shown in FIG. 5, the process housing 64 has a side board 641, a side board 642, and a supporting member 643. In other words, the process cartridge 6 has the side board 641, the side board 642, and the supporting member 643.

2.1.1 Side Board 641

The side board 641 is located on one end of the process housing 64 in the first direction. The side board 641 has an outer surface S1 and an inner surface S2.

Under the condition where the process cartridge 6 is supported by the drawer 5 (see FIG. 1), the outer surface S1 faces a side board (not shown) of the drawer 5 in the first direction. The side board of the drawer 5 is located on an end of the drawer 5 on one side in the first direction. The side board may support one end of the process cartridge 6 in the first direction. The side board has guides, which are now shown.

Figure 6:
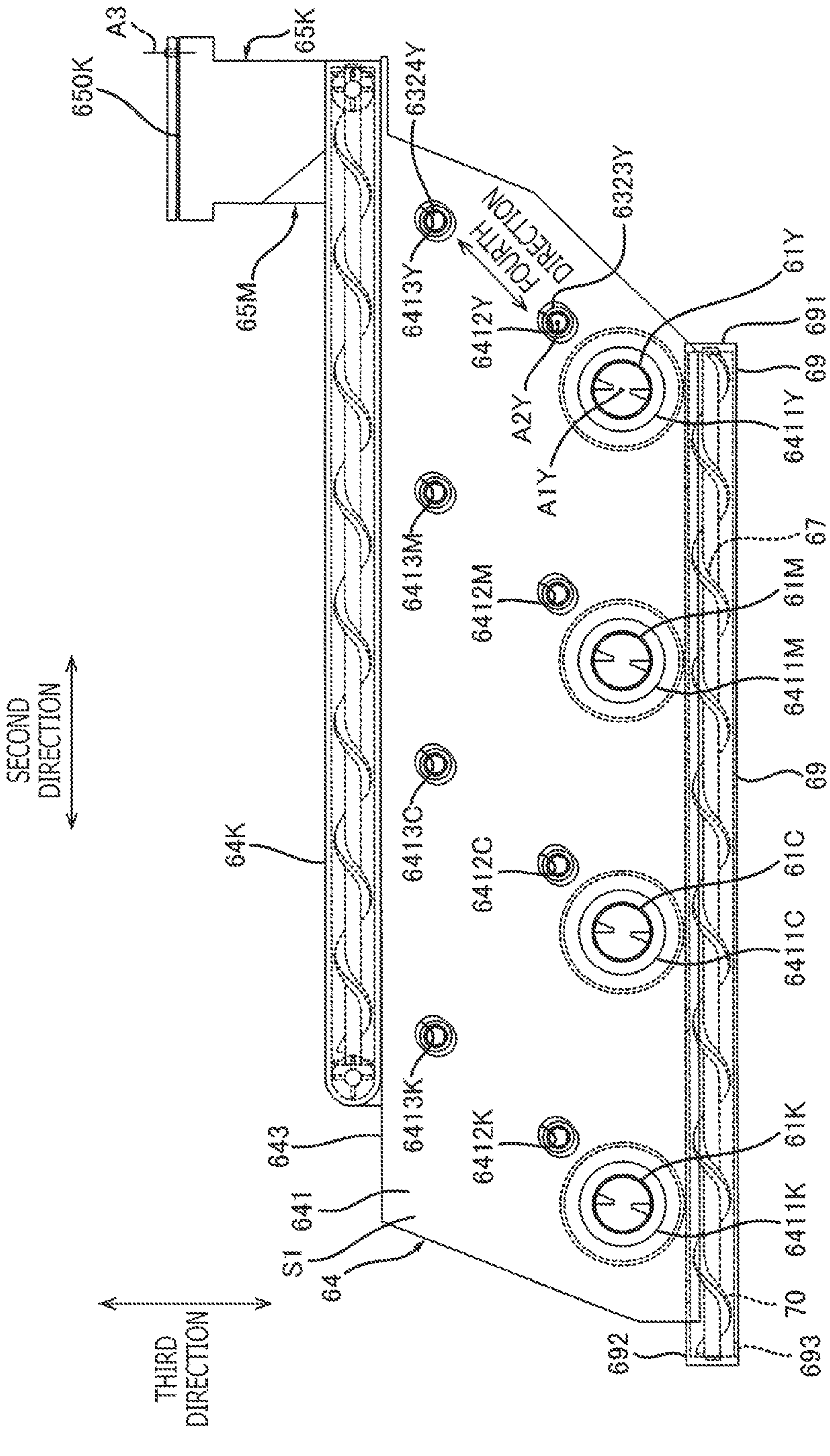
FIG. 6 is a side view of the process cartridge.

As shown in FIG. 6, the side board 641 extends in the second direction and a third direction, which intersects with the first direction and the second direction. Preferably, the third direction may intersect orthogonally with the first direction and with the second direction. Under a condition where the image forming apparatus 1 with the process cartridge 6 attached thereto is placed on the horizontal plane, the third direction may be a vertical direction. The side board 641 has a plurality of protrusions 6411Y, 6411M, 6411C, 6411K, a plurality of through holes 6412Y, 6412M, 6412C, 6412K, and a plurality of through holes 6413Y, 6413M, 6413C, 6413K.

As shown in FIGS. 5-6, the protrusion 6411Y is located on the outer surface S1 of the side board 641. The protrusion 6411Y extends in the first direction. The protrusion 6411Y extends outward from the outer surface S1 of the side board 641. The protrusion 6411Y has a cylindrical shape. The protrusion 6411Y may receive one end of the photosensitive drum 61Y in the first direction. Under a condition where the drawer 5 supports the process cartridge 6, the protrusion 6411Y fits in one of the guides (not shown) in the side board (not shown) of the drawer 5.

As shown in FIG. 6, the protrusions 6411Y, 6411M, 6411C, 6411K align in the second direction. The protrusions 6411M, 6411C, 6411K may be described similarly to the protrusion 6411Y; therefore, the description of the protrusions 6411M, 6411C, 6411K is herein omitted.

The through hole 6412Y is located between the protrusion 6411Y and the through hole 6413Y in a fourth direction. The fourth direction extends through the drum axis A1Y and the axis A2Y. The through hole 6412Y is an ellipse-shaped hole. The through hole 6412Y is elongated in the fourth direction. A protrusion 6323Y of the developing device 63Y, which will be described further below, may fit in the through hole 6412Y.

The through holes 6412M, 6412C, 6412K may be described similarly to the through hole 6412Y; therefore, description of the through holes 6412M, 6412C, 6412K is herein omitted.

The through hole 6413Y is located apart from the through hole 6412Y in the fourth direction. The through hole 6413Y is an ellipse-shaped hole. The through hole 6413Y is elongated in the fourth direction. A protrusion 6324Y of the developing device 63Y, which will be described further below, may fit in the through hole 6413Y.

The through holes 6413M, 6413C, 6413K may be described similarly to the through hole 6413Y; therefore, description of the through holes 6413M, 6413C, 6413K is herein omitted.

2.1.2 Side Board 642

As shown in FIG. 5, the side board 642 is located on the other end of the process housing 64 in the first direction. The side board 642 is located apart from the side board 641 in the first direction.

The side board 642 has an outer surface S3 and an inner surface S4. The inner surface S4 is located between the outer surface S3 and the side board 641.

Under the condition where the process cartridge 6 is supported by the drawer 5 (see FIG. 1), the outer surface S3 faces a side board 52 of the drawer 5 in the first direction. The side board 52 is located on the other end of the drawer 5 in the first direction. The side board 52 is located apart from the side board, which is not shown but is located on the one end of the drawer 5, in the first direction. The side board 52 may support the other end of the process cartridge 6 in the first direction. The side board 52 has a plurality of guides 54 (see FIG. 2), which are located on an inner side of the side board 52.

Figure 3:
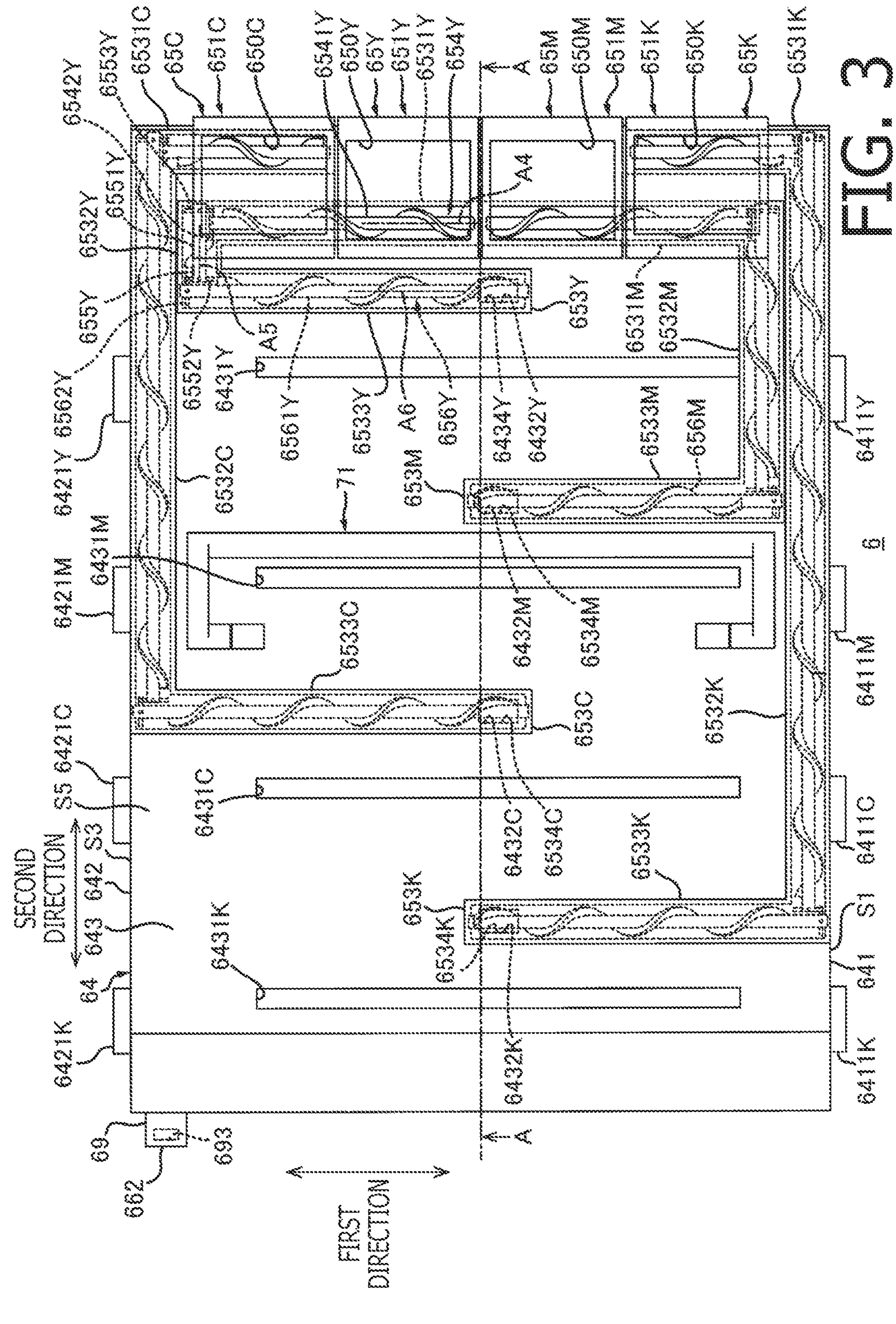
FIG. 3 is a plan view of the process cartridge for the image forming apparatus.

As shown in FIG. 3, the side board 642 extends in the second direction and the third direction. The side board 642 has a plurality of protrusions 6421Y, 6421M, 6421C, 6421K, a plurality of through holes 6422Y, 6422M, 6422C, 6422K, and a plurality of through holes 6423Y, 6423M, 6423C, 6423K. It is to be noted that the through holes 6422Y, 6422M, 6422C, 6422K, and the through holes 6423Y, 6423M, 6423C, 6423K are not shown in the drawings but have the reference sings assigned thereto merely in a purpose to distinguish them clearly from one another in the context.

As shown in FIG. 5, the protrusion 6421Y is located on the outer surface S3 of the side board 642. The protrusion 6421Y extends in the first direction. The protrusion 6421Y extends outward from the outer surface S3 of the side board 642. The protrusion 6421Y has a cylindrical shape. The protrusion 6421Y may receive the other end of the photosensitive drum 61Y in the first direction. Under the condition where the drawer 5 supports the process cartridge 6, the protrusion 6421Y fits in one of the guides 54 in the side board 52 of the drawer 5 (see FIG. 2).

As shown in FIG. 3, the protrusions 6421Y, 6421M, 6421C, 6421K align in the second direction. The protrusions 6421M, 6421C, 6421K may be described similarly to the protrusion 6421Y; therefore, the description of the protrusions 6421M, 6421C, 6421K is herein omitted.

The through holes 6422Y, 6422M, 6422C, 6422K, which are not shown, may be described similarly to the through holes 6412Y, 6412M, 6412C, 6412K, respectively. The through holes 6423Y, 6423M, 6423C, 6423K, which are not shown, may be described similarly to the through holes 6413Y, 6413M, 6413C, 6413K, respectively. Therefore, the description of the through holes 6422Y, 6422M, 6422C, 6422K and the through holes 6423Y, 6423M, 6423C, 6423K is herein omitted.

2.1.3 Supporting Member 643

As shown in FIGS. 3 and 5, the supporting member 643 is located between the side board 641 and the side board 642 in the first direction. The supporting member 643 extends in the first direction and the second direction. The supporting member 643 has a shape of a plate. The supporting member 643 has an upper surface S5 and a lower surface S6. The supporting member 643 may support the reloading devices 65Y, 65M, 65C, 65K.

As shown in FIGS. 3 and 4, the supporting member 643 has a plurality of slits 6431Y, 6431M, 6431C, 6431K and a plurality of through holes 6432Y, 6432M, 6432C, 6432K (see FIG. 4).

2.1.3.1 Slits 6431Y, 6431M, 6431C, 6431K

As shown in FIG. 3, the slits 6431Y, 6431M, 6431C, 6431K extend in the first direction. The slits 6431Y, 6431M, 6431C, 6431K align in the second direction. The slits 6431Y, 6431M, 6431C, 6431K are spaced apart from one another in the second direction. Light emitted from the exposure device 7 at the photosensitive drum 61Y may pass through the slit 6431Y. Light emitted from the exposure device 7 at the photosensitive drum 61M may pass through the slit 6431M. Light emitted from the exposure device 7 at the photosensitive drum 61C may pass through the slit 6431C. Light emitted from the exposure device 7 at the photosensitive drum 61K may pass through the slit 6431K. In other words, the slits 6431Y, 6431M, 6431C, 6431K allow the light emitted from the exposure device 7 to pass there-through to reach the photosensitive drums 61Y, 61M, 61C, 61K, respectively.

2.1.3.2 Through Holes 6432Y, 6432M, 6432C, 6432K

As shown in FIG. 3, the through holes 6432Y, 6432M, 6432C, 6432K are located in a central area in the supporting member 643 in the first direction. The through holes 6432Y, 6432M, 6432C, 6432K align in the second direction.

The through hole 6432Y is located on one side of the slit 6431Y opposite to the through hole 6432M in the second direction.

The through hole 6432M is located between the slit 6431Y and the slit 6431M in the second direction.

The through hole 6432C is located between the slit 6431M and the slit 6431C in the second direction.

The through hole 6432K is located between the slit 6431C and the slit 6431K in the second direction.

2.2 Reloading Devices 65Y, 65M, 65C, 65K

The reloading devices 65Y, 65M, 65C, 65K are located on the upper surface S5 of the supporting member 643. In particular, the reloading devices 65Y, 65M, 65C, 65K are attached to the upper surface S5 of the supporting member 643.

The reloading device 65Y may reload the developing device 63Y with the toner. The reloading device 65M may reload the developing device 63M with the toner. The reloading device 65C may reload the developing device 63C with the toner. The reloading device 65K may reload the developing device 63K with the toner.

As shown in FIG. 3, the reloading device 65Y has a container 651Y and a toner tube 653Y. The reloading device 65M has a container 651M and a toner tube 653M. The reloading device 65C has a container 651C and a toner tube 653C. The reloading device 65K has a container 651K and a toner tube 653K.

2.2.1 Containers 651Y, 651M, 651C, 651K The containers 651Y, 651M, 651C, 651K are located on one end of the process cartridge 6 in the second direction. The containers 651Y, 651M, 651C, 651K align in the first direction. Each of the containers 651Y, 651M, 651C, 651K may have a rectangular-boxed shape elongated in the third direction, as shown in FIGS. 3-4.

2.2.1.1 Reloading Ports 650Y, 650M, 650C, 650K

The container 651Y has a reloading port 650Y. In other words, the reloading device 65Y has the reloading port 650Y. The container 651M has a reloading port 650M. In other words, the reloading device 65M has the reloading port 650M (see FIG. 3). The container 651C has a reloading port 650C. In other words, the reloading device 65C has the reloading port 650C. The container 651K has a reloading port 650K. In other words, the reloading device 65K has the reloading port 650K. The reloading ports 650Y, 650M, 650C, 650K align in the first direction.

Figure 7:
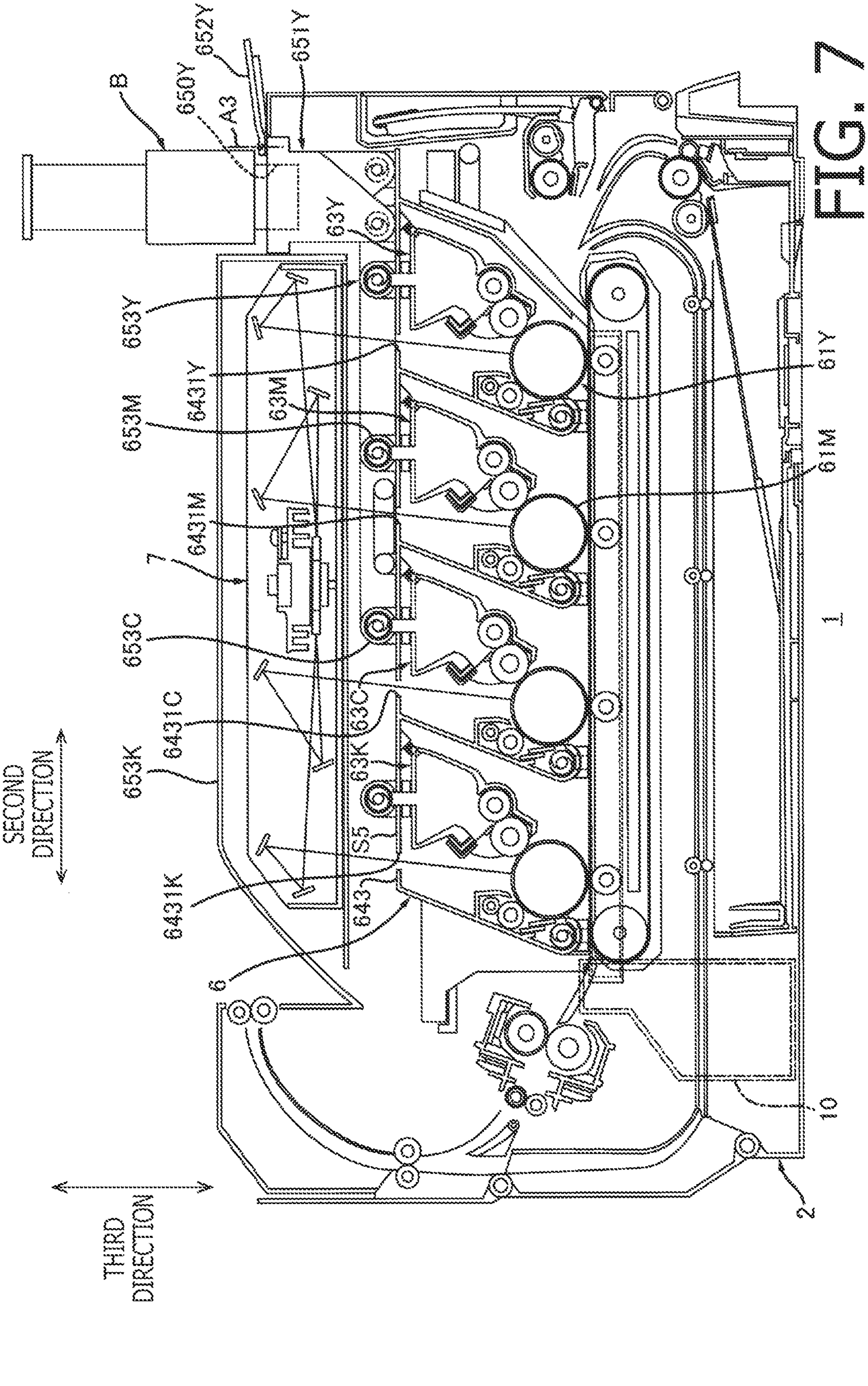
FIG. 7 is an illustrative view of a reloading bottle being received in a reloading port of a reloading device.

The reloading port 650Y may accept the toner to be supplied to the developing device 63Y. As shown in FIG. 1, under the condition where the process cartridge 6 is supported by the drawer 5 and where the drawer 5 is located at the inner position, the reloading port 650Y is openable to the outside of the main housing 2. Under the condition where the process cartridge 6 is supported by the drawer 5 and where the drawer 5 is located at the inner position, the reloading port 650Y is exposed externally from the main housing 2. The reloading port 650Y is openable upward. Under the condition where the process cartridge 6 is supported by the drawer 5 and where the drawer 5 is located at the inner position, the reloading port 650Y is located between the ejection tray 23 and the cover 3 in the second direction. Under the condition where the process cartridge 6 is supported by the drawer 5 and where the drawer 5 is located at the inner position, the reloading port 650Y is located to be lower than an upper end of the ejection tray 23. Under the condition where the process cartridge 6 is supported by the drawer 5 and where the drawer 5 is located at the inner position, the reloading port 650Y is located between the exposure device 7 and the cover 3 in the second direction. Under the condition where the process cartridge 6 is supported by the drawer 5 and where the drawer 5 is located at the inner position, the reloading port 650Y is located to be lower than an upper end of the exposure device 7. The reloading port 650Y is located on an upper end of the container 651Y. The reloading port 650Y is located on one end of the container 651Y in the third direction. As shown in FIG. 7, in the reloading port 650Y, a part of a reloading bottle B may be inserted. For example, the part of the reloading bottle B may be a lower-end part of the reloading bottle B. The reloading bottle B may contain the toner. The reloading bottle B may be detached from the reloading port 650Y after the toner is transported from the reloading bottle B to the reloading device 65Y.

As shown in FIG. 3, the reloading port 650M may accept the toner to be supplied to the developing device 63M. As shown in FIG. 1, under the condition where the process cartridge 6 is supported by the drawer 5 and where the drawer 5 is located at the inner position, the reloading port 650M is openable to the outside of the main housing 2. Under the condition where the process cartridge 6 is supported by the drawer 5 and where the drawer 5 is located at the inner position, the reloading port 650M is exposed externally from the main housing 2. Under the condition where the process cartridge 6 is supported by the drawer 5 and where the drawer 5 is located at the inner position, the reloading port 650M is openable upward. Under the condition where the process cartridge 6 is supported by the drawer 5 and where the drawer 5 is located at the inner position, the reloading port 650M is located between the ejection tray 23 and the cover 3 in the second direction. Under the condition where the process cartridge 6 is supported by the drawer 5 and where the drawer 5 is located at the inner position, the reloading port 650M is located to be lower than the upper end of the ejection tray 23. Under the condition where the process cartridge 6 is supported by the drawer 5 and where the drawer 5 is located at the inner position, the reloading port 650M is located between the exposure device 7 and the cover 3 in the second direction. Under the condition where the process cartridge 6 is supported by the drawer 5 and where the drawer 5 is located at the inner position, the reloading port 650M is located to be lower than the upper end of the exposure device 7. The reloading port 650M is located on an upper end of the container 651M. The reloading port 650M is located on one end of the container 651M in the third direction.

The reloading port 650C may accept the toner to be supplied to the developing device 63C. The reloading port 650K may accept the toner to be supplied to the developing device 63K. The reloading ports 650C, 650K may be described similarly to the reloading ports 650Y, 650M; therefore, description of the reloading ports 650C, 650K is herein omitted.

2.2.2 Toner Tube 653Y

As shown in FIGS. 3-4, the toner tube 653Y allows the toner travelling from the container 651Y to the developing device 63Y to pass there-through. Under a condition where the process cartridge 6 is attached to the image forming apparatus 1 (see FIG. 1), the toner tube 653Y is located between the photosensitive drum 61Y and the exposure device 7 in the third direction. One end of the toner tube 653Y is continuous with the container 651Y. The other end of the toner tube 653Y is continuous with the developing device 63Y. The toner tube 653Y has a section 6531Y, a section 6532Y, and a section 6533Y. The sections 6531Y, 6532Y, 6533Y may each have a cylindrical form.

The section 6531Y extends in the first direction. The section 6531Y is connected with the container 651Y.

The section 6532Y extends in the second direction. The section 6532Y is continuous with the section 6531Y. The section 6532Y extends in the second direction from an end of the section 6531Y on the other side in the first direction. In other words, the section 6532Y is continuous with the end of the section 6531Y on the other side in the first direction at the end thereof on one side in the second direction and extends in the second direction.

The section 6533Y extends in the first direction. The section 6533Y is continuous with the section 6532Y. The section 6533Y extends in the first direction from an end of the section 6532Y on the other side in the second direction toward the through hole 6432Y. The section 6533Y has an outlet 6534Y.

The toner may be discharged from the toner tube 653Y through the outlet 6534Y. The outlet 6534Y is located on an end of the section 6533Y on the one side in the first direction. The outlet 6534Y is continuous with the through hole 6432Y.

2.2.3 Toner Tube 653M

The toner tube 653M allows the toner travelling from the container 651M to the developing device 63M to pass there-through. Under the condition where the process cartridge 6 is attached to the image forming apparatus 1 (see FIG. 1), the toner tube 653M is located between the photosensitive drum 61Y and the exposure device 7 in the third direction.

The light emitted from the exposure device 7 at the photosensitive drum 61Y may travel between the toner tube 653Y and the toner tube 653M. One end of the toner tube 653M is continuous with the container 651M. The other end of the toner tube 653M is continuous with the developing device 63M. The toner tube 653M has sections 6531M, 6532M, 6533M. The sections 6531M, 6532M, 6533M may each have a cylindrical form.

The section 6531M extends in the first direction. The section 6531M is connected with the container 651M.

The section 6532M extends in the second direction. The section 6532M is continuous with the section 6531M. The section 6532M extends in the second direction from an end of the section 6531M on the one side in the first direction. The section 6532M is longer than the section 6532Y.

The section 6533M extends in the first direction. The section 6533M is continuous with the section 6532M. The section 6533M extends in the first direction from an end of the section 6532M on the other side in the second direction toward the through hole 6432M. The section 6533M has an outlet 6534M.

The toner may be discharged from the toner tube 653M through the outlet 6534M. The outlet 6534M is located on an end of the section 6533M on the other side in the first direction. The outlet 6534M is continuous with the through hole 6432M.

2.2.4 Toner Tube 653C

The toner tube 653C allows the toner traveling from the container 651C to the developing device 63C to pass there-through. The light emitted from the exposure device 7 at the photosensitive drum 61M may travel between the toner tube 653M and the toner tube 653C. One end of the toner tube 653C is continuous with the container 651C. The other end of the toner tube 653C is continuous with the developing device 63C. The toner tube 653C has sections 6531C, 6532C, 6533C. The sections 6531C, 6532C, 6533C may each have a cylindrical form.

The section 6531C extends in the first direction. The section 6531C is connected with the container 651C.

The section 6532C extends in the second direction. The section 6532C is continuous with the section 6531C. The section 6532C extends in the second direction from an end of the section 6531C on the other side in the first direction. The section 6532C is longer than the section 6532M.

The section 6533C extends in the first direction. The section 6533C is continuous with the section 6532C. The section 6533C extends in the first direction from an end of the section 6532C on the other side in the second direction toward the through hole 6432C. The section 6533C has an outlet 6534C.

The toner may be discharged from the toner tube 653C through the outlet 6534C. The outlet 6534C is located on an end of the section 6533C on the one side in the first direction. The outlet 6534C is continuous with the through hole 6432C.

The slit 6431Y is located between the section 6533Y and the section 6533M in the second direction. The slit 6431Y is located between the section 6532M and the section 6532C in the first direction.

2.2.5 Toner Tube 653K

The toner tube 653K allows the toner travelling from the container 651K to the developing device 63K to pass there-through. The light emitted from the exposure device 7 at the photosensitive drum 61C may travel between the toner tube 653C and the toner tube 653K. One end of the toner tube 653K is continuous with the container 651K. The other end of the toner tube 653K is continuous with the developing device 63K. The toner tube 653K has sections 6531K, 6532K, 6533K. The sections 6531K, 6532K, 6533K may each have a cylindrical form.

The section 6531K extends in the first direction. The section 6531K is connected with the container 651K.

The section 6532K extends in the second direction. The section 6532K is continuous with the section 6531K. The section 6532K extends in the second direction from an end of the section 6531K on the one side in the first direction. The section 6532K is longer than the section 6532C.

The section 6533K extends in the first direction. The section 6533K is continuous with the section 6532K. The section 6533K extends in the first direction from an end of the section 6532K on the other side in the second direction toward the through hole 6432K. The section 6533K has an outlet 6534K.

The toner may be discharged from the toner tube 653K through the outlet 6534K. The outlet 6534K is located on an end of the section 6533K on the other side in the first direction. The outlet 6534K is continuous with the through hole 6432K.

The slit 6431M is located between the section 6533M and the section 6533C in the second direction.

The slit 6431C is located between the section 6533C and the section 6533K in the second direction.

The slit 6431K is located on a side of the section 6533K opposite to the slit 6431C in the second direction.

2.2.6 Detailed Configuration of Reloading Device 65Y

The reloading device 65Y has, further to the container 651Y and the toner tube 653Y described above, a port cover 652Y (see FIG. 4), and a plurality of screws 654Y, 655Y, 656Y.

2.2.6.1 Port Cover 652Y

As shown in FIGS. 4 and 7, the port cover 652Y is movable between a closing position and an opening position. When the port cover 652Y is located at the opening position, the reloading port 650Y is open. When the port cover 652Y is located at the closing position, the reloading port 650Y is closed. The port cover 652Y may be pivotable on an axis A3, which extends in the third direction.

2.2.6.2 Screws 654Y, 655Y, 656Y

As shown in FIG. 3, the screw 654Y is located inside the section 6531Y. The screw 654Y may convey the toner in the section 6531Y to the section 6532Y. The screw 654Y extends in the first direction. The screw 654Y is rotatable on an axis A4, which extends in the first direction. The screw 654Y may be an auger screw. The screw 654Y includes a shaft 6541Y and a plurality of pins 6542Y.

The shaft 6541Y extends in the first direction. The shaft 6541Y may have a cylindrical shape.

Figure 8:
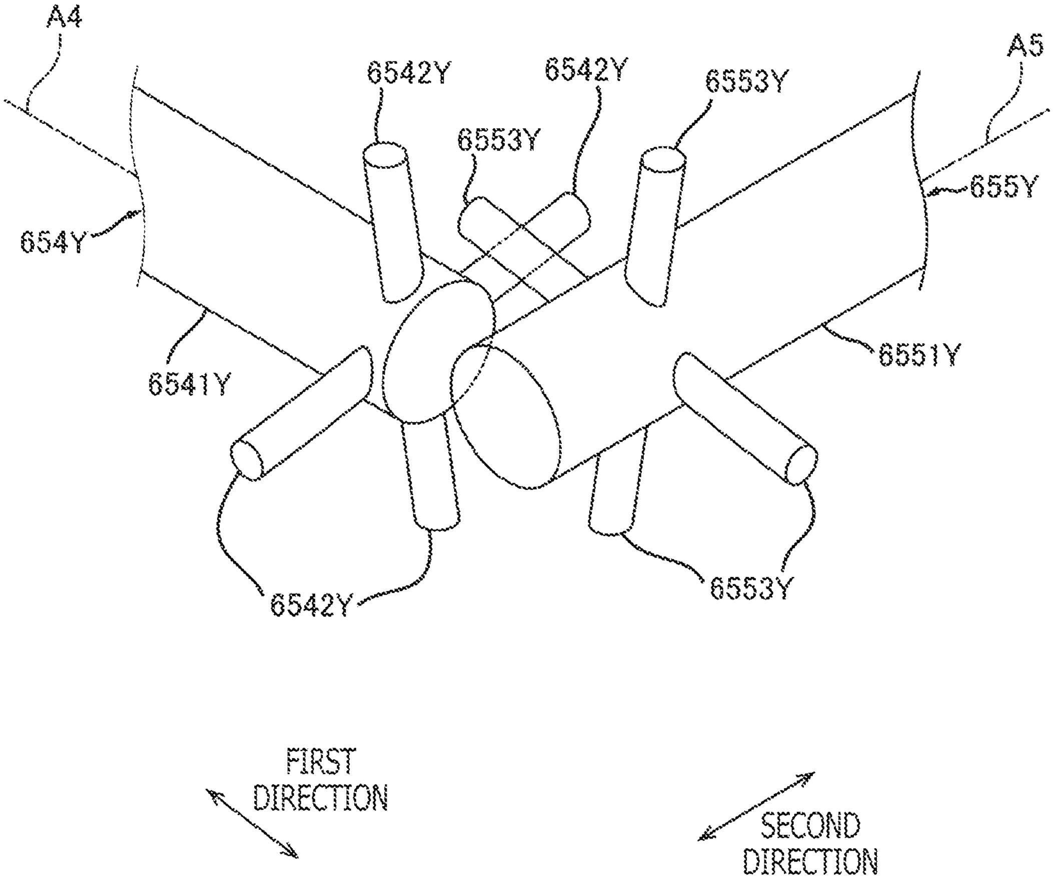
FIG. 8 is a perspective view of pins contacting each other.

The pins 6542Y are located on an end of the shaft 6541Y on the other side in the first direction. As shown in FIG. 8, the pins 6542Y extend from a circumferential surface of the shaft 6541Y. The pins 6542Y extend in directions intersecting with the axis A4. Preferably, the pins 6542Y may extend in directions intersecting orthogonally with the axis A4. The pins 6542Y may be attached to the circumferential surface of the shaft 6541Y.

As shown in FIG. 3, the screw 655Y is located inside the section 6532Y. The screw 655Y may convey the toner in the section 6532Y to the section 6533Y. The screw 655Y extends in the second direction. The screw 655Y is rotatable on an axis A5, which extends in the second direction. The screw 655Y may be an auger screw. The screw 655Y includes a shaft 6521Y and a plurality of pins 6552Y.

The shaft 6551Y extends in the second direction. The shaft 6551Y may have a cylindrical shape.

The pins 6552Y are located on an end of the shaft 6551Y on the other side in the second direction. The pins 6552Y extend from a circumferential surface of the shaft 6551Y. The pins 6552Y extend in directions intersecting with the axis A5. Preferably, the pins 6552Y may extend in directions intersecting orthogonally with the axis A5. The pins 6552Y may be attached to the circumferential surface of the shaft 6551Y The pins 6553Y are located on an end of the shaft 6551Y on the one side in the second direction. The pins 6553Y are located apart from the pins 6552Y in the second direction. As shown in FIG. 8, the pins 6553Y extend from the circumferential surface of the shaft 6551Y. The pins 6553Y extend in directions intersecting with the axis A5. Preferably, the pins 6553Y may extend in directions intersecting orthogonally with the axis A5. The pins 6553Y may be attached to the circumferential surface of the shaft 6551Y.

As the screw 654Y rotates, the pins 6542Y may contact the pins 6553Y one after another. Thus, the screw 655Y may rotate.

As shown in FIG. 3, the screw 656Y is located inside the section 6533Y. The screw 656Y may convey the toner in the section 6533Y to the outlet 6534Y. The screw 656Y extends in the first direction. The screw 656Y is rotatable on an axis A6, which extends in the first direction. The screw 656Y may be an auger screw. The screw 656Y includes a shaft 6561Y and a plurality of pins 6562Y.

The shaft 6561Y extends in the first direction. The shaft 6561Y may have a cylindrical shape.

The pins 6562Y are located on an end of the shaft 6561Y on the other side in the first direction. The pins 6562Y extend from a circumferential surface of the shaft 6561Y The pins 6562Y extend in directions intersecting with the axis A6. Preferably, the pins 6562Y may extend in directions intersecting orthogonally with the axis A6. The pins 6562Y may be attached to the circumferential surface of the shaft 6561Y.

As the screw 655Y rotates, the pins 6552Y may contact the pins 6562Y one after another. Thus, the screw 656Y may rotate.

2.2.7 Detailed Configuration of Reloading Devices 65M, 65C, 65K

The reloading devices 65M, 65C, 65K may be described similarly to the reloading device 65Y; therefore, description of the reloading devices 65M, 65C, 65K is herein omitted.

2.3 Detailed Configuration of Developing Devices 63Y, 63M, 63C, 63K As shown in FIG. 4, the developing device 63Y has the development housing 632Y, a plurality of protrusions 6323Y (see FIG. 6), 6324Y (see FIG. 6), 6325Y, 6326Y It is to be noted that the protrusions 6325Y, 6326Y are not shown in the drawings but have the reference sings assigned thereto merely in a purpose to distinguish them clearly from one another in the context. The development housing 632Y has an inlet 6328Y The inlet 6328Y may accept the toner from the reloading device 65Y. The inlet 6328Y is located in a central area of the development housing 632Y in the first direction. In other words, the inlet 6328Y is located in a central area of the process cartridge 6 in the first direction. The inlet 6328Y is located at an upper end of the development housing 632Y.

The protrusion 6323Y (see FIG. 6) is located on a surface of the development housing 632Y on the one side in the first direction. As shown in FIG. 6, the protrusion 6323Y has a cylindrical shape. The protrusion 6323Y extends in the first direction. The protrusion 6323Y fits in the through hole 6412Y.

The protrusion 6324Y is located on the surface of the development housing 632Y on the one side in the first direction. The protrusion 6324Y is located apart from the protrusion 6323Y in the fourth direction. The protrusion 6324Y has a cylindrical shape. The protrusion 6324Y extends in the first direction. The protrusion 6324Y fits in the through hole 6413Y.

The protrusions 6325Y, 6326Y are located on a surface of the development housing 632Y on the other side in the first direction. The protrusions 6325Y, 6326Y each have a cylindrical shape. The protrusions 6325Y, 6326Y extend in the first direction. The protrusion 6325Y fits in the through hole 6422Y, and the protrusion 6326Y fits in the through hole 6423Y.

With the protrusions 6323Y, 6324Y, 6325Y, 6326Y fitted in the through holes 6412Y, 6413Y, 6422Y, 6423Y, respectively, the developing device 63Y is movable with respect to the photosensitive drum 61Y.

The developing devices 63M, 63C, 63K may be described similarly to the developing device 63Y; therefore, description of the developing devices 63M, 63C, 63K is herein omitted. In other words, the development housing 632M has an inlet 6328M. The inlet 6328M may accept the toner from the reloading device 65M. The inlet 6328M is located in the central area of the process cartridge 6 in the first direction. The inlet 6328Y and the inlet 6328M align in the second direction. The developing device 63M is movable with respect to the photosensitive drum 61M.

2.4 Detailed Configuration of Sealer Members 66Y, 66M, 66C, 66K

The sealer member 66Y may seal a gap between the reloading device 65Y and the development housing 632Y. The sealer member 66Y is located between the supporting member 643 and the development housing 632Y The sealer member 66Y has a through hole 661Y. The sealer member 66Y is arranged to contact the supporting member 643. The sealer member 66Y is arranged to contact the development housing 632Y. The through hole 661Y is continuous with the outlet 6534Y. In particular, the through hole 661Y is continuous with the outlet 6534Y via the through hole 6432Y The through hole 661Y is continuous with the inlet 6328Y. The sealer member 66Y may be made of, for example, a resilient material and may include sponge. The sealer member 66Y is deformable in response to the moving behavior of the developing device 63Y.

The sealer members 66M, 66C, 66K may be described similarly to the sealer member 66Y; therefore, description of the sealer members 66M, 66C, 66K is herein omitted. In other words, the sealer member 66M may seal a gap between the reloading device 65M and the development housing 632M. The sealer member 66M has a through hole 661M. The through hole 661M is continuous with the inlet 6328M. The sealer member 66Y is deformable in response to the moving behavior of the developing device 63M.

2.5 Pressing Members 67Y, 67M, 67C, 67K

The pressing member 67Y may press the development housing 632Y toward the photosensitive drum 61Y. The pressing member 67M may press the development housing 632M toward the photosensitive drum 61M. The pressing member 67C may press the development housing 632C toward the photosensitive drum 61C. The pressing member 67K may press the development housing 632K toward the photosensitive drum 61K.

2.6 Cleaners 68Y, 68M, 68C, 68K

The cleaner 68Y may clean the surface of the photosensitive drum 61Y. The cleaner 68Y has a cleaner housing 681Y, a cleaning member 682Y, and a screw 683Y.

The cleaner housing 681Y may store waste toner collected from the photosensitive drum 61Y. The cleaner housing 681Y has an opening 6811Y.

The cleaning member 682Y may clean the surface of the photosensitive drum 61Y. The cleaning member 682Y is attached to the cleaner housing 681Y. The cleaning member 682Y is in contact with the surface of the photosensitive drum 61Y at an edge thereof. Waste toner scraped off from the surface of the photosensitive drum 61Y by the cleaning member 682Y may enter the cleaner housing 681Y through the opening 6811Y.

The screw 683Y is located inside the cleaner housing 681Y. The screw 683Y may convey the waste toner in the cleaner housing 681Y toward a waste toner tube 69. The screw 683Y extends in the first direction. The screw 683Y may be an auger screw. Optionally, the screw 683Y may be a shaftless screw.

The cleaner 68M may clean the surface of the photosensitive drum 61M. The cleaner 68C may clean the surface of the photosensitive drum 61C. The cleaner 68K may clean the surface of the photosensitive drum 61K. The cleaners 68M, 68C, 68K may be described similarly to the cleaner 68Y; therefore, description of the cleaners 68M, 68C, 68K is herein omitted.

2.7 Waste Toner Tube 69, Screw 70, and Waste Toner Container 10

With reference to FIGS. 3-8, the waste toner tube 69, a screw 70, and a waste toner container 10 will be described in detail.

2.7.1 Waste Toner Tube 69

As shown in FIG. 4, the waste toner tube 69 is connected with the cleaners 68Y, 68M, 68C, 68K. The waste toner tube 69 allows the waste toner from the cleaners 68Y, 68M, 68C, 68K to pass there-through. The waste toner tube 69 extends in the second direction. The waste toner tube 69 has one end 691 on the one side and the other end 692 on the other side in the second direction. The other end 692 is located apart from the one end 691 in the second direction. The waste toner tube 69 has a waste toner outlet 693. The waste toner outlet 693 is located on the other end 692 of the waste toner tube 69 in the second direction. The waste toner may be discharged from the waste toner tube 69 through the waste toner outlet 693.

As shown in FIG. 5, the waste toner tube 69 is located between the side board 641 and the side board 642 of the process housing 64 in the first direction.

As shown in FIG. 1, the image forming apparatus 1 has the waste toner container 10. Under the condition where the process cartridge 6 is attached to the image forming apparatus 1, the waste toner container 10 is located inside the main housing 2. Under a condition where the waste toner tube 69 is connected with the waste toner container 10, the waste toner discharged from the waste toner outlet 693 may enter the waste toner container 10, and the waste toner container 10 may store the waste toner. As shown in FIG. 2, under the condition where the drawer 5 is located at the outer position, the waste toner tube 69 is separated from the waste toner container 10. The waste toner container 10 is removable from the main housing 2 and is exchangeable.

2.7.2 Screw 70

As shown in FIGS. 5 and 6, the screw 70 is located inside the waste toner tube 69. The screw 70 may convey the waste toner in the waste toner tube 69 toward the waste toner outlet 693. The screw 70 extends in the second direction. The screw 70 may be an auger screw. Optionally, the screw 70 may be a shaftless screw.

2.8 Handle 71

As shown in FIG. 3, the process cartridge 6 has a handle 71. The handle 71 is located in a central area in the second direction and in a central area in the first direction in the process cartridge 6. The handle 71 is located between the section 6532C and the section 6532K in the first direction.

3. Benefits (1) According to the image forming apparatus 1, the developing device 63Y may be reloaded with the toner from the outside of the main housing 2 through the reloading port 650Y. Moreover, the developing device 63M may be reloaded with the toner from the outside of the main housing 2 through the reloading port 650M.

(2) According to the image forming apparatus 1, the toner may be poured easily through the reloading port 650Y from above, and the toner may be poured easily through the reloading port 650M from above.

(3) According to the image forming apparatus 1, the ejected sheet S on the ejection tray 23 may be restrained from covering the reloading ports 650Y, 650M.

Therefore, while the sheet S stays on the ejection tray 23, the developing devices 63Y, 63M may be easily reloaded with the toners through the reloading ports 650Y, 650M, respectively.

(4) According to the image forming apparatus 1, even if the toner spills from the reloading port 650Y or the reloading port 650M, the sheet S may be restrained from being smeared with the spilled toner.

Moreover, the user may pick up the ejected sheet S while interference from the reloading ports 650Y, 650M may be restrained.

(5) According to the image forming apparatus 1, even if the developing device 63Y moves with respect to the photosensitive drum 61Y, the sealer member 66Y may resiliently deform and therefore restrain the toner from leaking through the gap between the reloading device 65Y and the development housing 632Y. Moreover, even if the developing device 63M moves with respect to the photosensitive drum 61M, the sealer member 66M may resiliently deform and therefore restrain the toner from leaking through the gap between the reloading device 65M and the development housing 632M.

(6) According to the image forming apparatus 1, the user may grab the handle 71 to maintain the process cartridge 6 in a balanced posture.

Therefore, the user may transport the process cartridge 6 securely.

4. Modified Example

Figure 9:
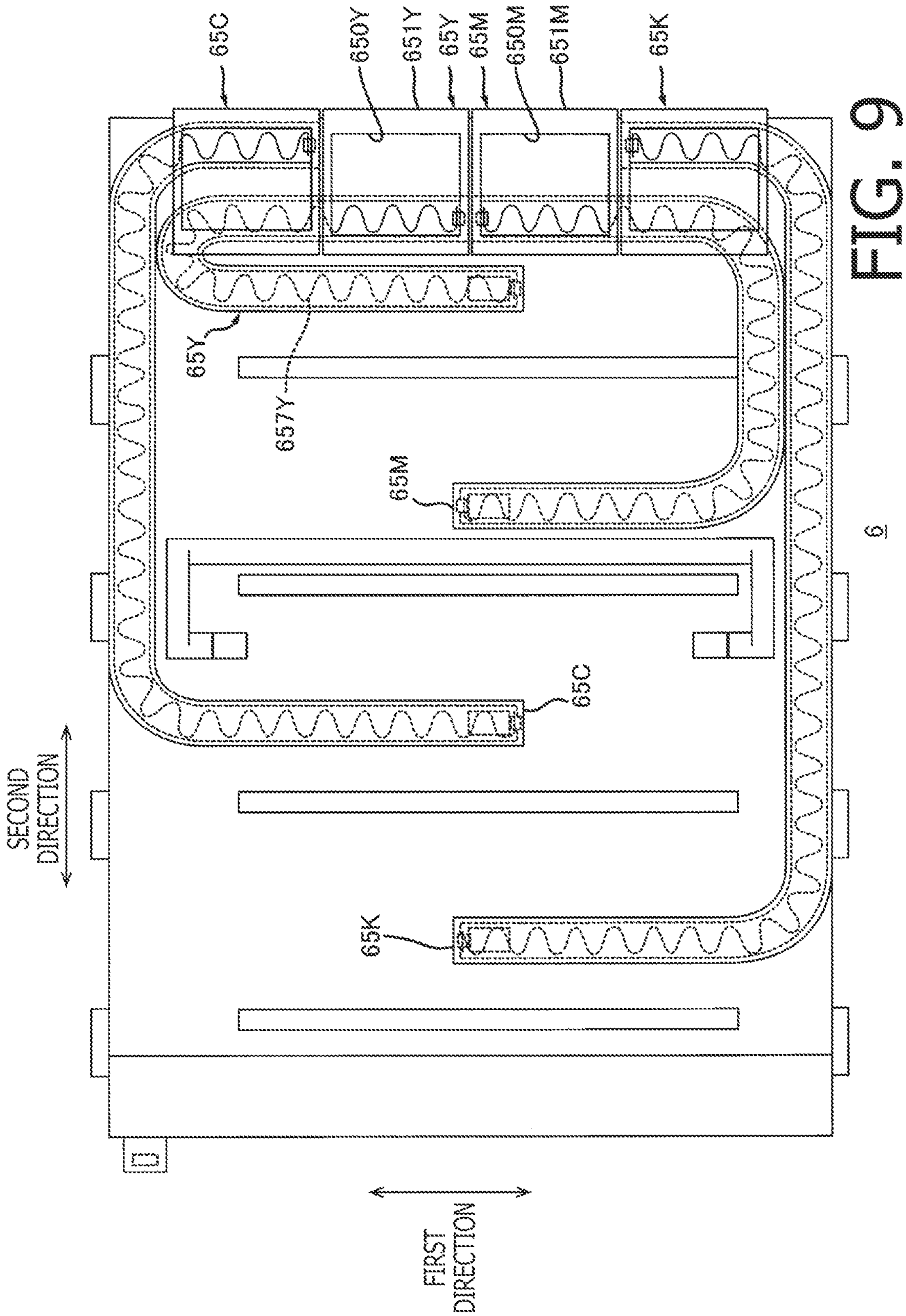
FIG. 9 is a modified example of the process cartridge.

With reference to FIG. 9, a modified example of the embodiment will be described. In the modified example, items that are identical to those described above will be referred to by the same reference signs, and description of those items is herein omitted.

The reloading device 65Y has a screw 657Y in place of the screws 654Y, 655Y, 656Y. The screw 657Y is a shaftless screw.

The reloading devices 65M, 65C, 65K may be described similarly to the reloading device 65Y; therefore, description of the reloading devices 65M, 65C, 65K is herein omitted.

Although examples of carrying out the invention have been described, those skilled in the art will appreciate that there are numerous variations and permutations of the image forming apparatus that fall within the spirit and the scope of the invention as set forth in the appended claims. It is to be understood that the subject matter defined in the appended claims is not necessarily limited to the specific features or act described above. Rather, the specific features and acts described above are disclosed as example forms of implementing the claims. In the meantime, the terms used to represent the components in the above embodiment may not necessarily agree identically with the terms recited in the appended claims, but the terms used in the above embodiments may merely be regarded as examples of the claimed subject matters.

What is claimed is:

1. A process cartridge usable in an image forming apparatus, comprising:

a first photosensitive drum;

a second photosensitive drum;

a first developing device configured to supply toner to the first photosensitive drum;

a second developing device configured to supply toner to the second photosensitive drum;

a first reloading device having a first reloading port, the first reloading port being configured to accept the toner supplied externally for reloading the first developing device; and a second reloading device having a second reloading port, the second reloading port being configured to accept the toner supplied externally for reloading the second developing device, wherein the first reloading device and the second reloading device are aligned in a first direction, wherein the first developing device and the second developing device are aligned in a second direction, the second direction intersecting with the first direction, and wherein the first reloading port and the second reloading port are located on solely one side in the second direction in the process cartridge.

2. The process cartridge according to claim 1, wherein the first reloading port and the second reloading port are open in a third direction, the third direction intersecting with the first direction and the second direction, on one side of the first reloading device and the second reloading device, respectively, opposite to a side where the first photosensitive drum and the second photosensitive drum are located, in the third direction.

3. The process cartridge according to claim 1, wherein the first reloading device includes:

a first container having the first reloading port; and a first toner tube allowing the toner travelling from the first container to the first developing device to pass there-through, the second reloading device includes:

a second container having the second reloading port; and a second toner tube allowing the toner travelling from the second container to the second developing device to pass there-through, and the first toner tube and the second toner tube extend at least partly in the second direction.

4. The process cartridge according to claim 3, wherein the first toner tube is connected with the first container at a position toward one end of the first container closer to the first photosensitive drum and opposite to the first reloading port in a third direction, the third direction intersecting with the first direction and the second direction, and the second toner tube is connected with the second container at a position toward one end of the second container closer to the second photosensitive drum and opposite to the second reloading port in the third direction.

5. The process cartridge according to claim 3, wherein the first toner tube has a section located on one end of the process cartridge on one side in the first direction, and the second toner tube has a section located on the other end of the process cartridge on the other side in the first direction.

6. The process cartridge according to claim 1, wherein the first developing device has a first developing roller, a first development housing, and a first inlet through which the toner from the first reloading device is acceptable, and the second developing device has a second developing roller, a second development housing having a second inlet through which the toner from the second reloading device is acceptable.

7. The process cartridge according to claim 6, further comprising:

a first sealer member sealing a gap between the first reloading device and the first development housing; and a second sealer member sealing a gap between the second reloading device and the second development housing.

8. The process cartridge according to claim 7, wherein the first developing device is movable with respect to the first photosensitive drum, the second developing device is movable with respect to the second photosensitive drum, the first sealer member is resiliently deformable in response to a moving behavior of the first developing device, and the second sealer member is resiliently deformable in response to a moving behavior of the second developing device.

9. The process cartridge according to claim 1, further comprising:

a first cleaner configured to clean a surface of the first photosensitive drum;

a second cleaner configured to clean a surface of the second photosensitive drum; and a waste toner tube, through which waste toner from the first cleaner and the second cleaner is conveyed.

* * * * *